United States Patent [19]

Olsen et al.

[11] Patent Number: 4,792,280
[45] Date of Patent: Dec. 20, 1988

[54] HELICOPTER ROTOR FLEXBEAM

[75] Inventors: Eric G. Olsen, Woodbury; Thomas G. Campbell, Cheshire, both of Conn.

[73] Assignee: United Technologies Corporation, Hartford, Conn.

[21] Appl. No.: 43,057

[22] Filed: Apr. 27, 1987

[51] Int. Cl.[4] .............................................. B64C 27/38
[52] U.S. Cl. .................. 416/134 A; 416/138; 416/141
[58] Field of Search .......... 416/134 A, 138 A, 140 A, 416/141 R, 135 B, 230 A

[56] References Cited

U.S. PATENT DOCUMENTS

| 2,757,745 | 8/1956 | Verhage et al. | 416/138 A X |
|---|---|---|---|
| 3,999,886 | 12/1976 | Ormiston et al. | 416/138 A X |
| 4,028,003 | 6/1977 | Krauss | 416/141 |
| 4,111,605 | 9/1978 | Roman et al. | 416/141 |
| 4,266,912 | 5/1981 | Roman | 416/141 |
| 4,306,837 | 12/1981 | Brogdon et al. | 416/141 X |
| 4,419,051 | 12/1983 | De Rosa | 416/141 X |
| 4,466,774 | 8/1984 | Cycon et al. | 416/134 A X |
| 4,616,977 | 10/1986 | Schramm | 416/134 A X |
| 4,645,423 | 2/1987 | Ferris et al. | 416/134 A X |

FOREIGN PATENT DOCUMENTS 3332417 3/1985 Fed. Rep. of Germany ... 416/134 A

Primary Examiner—Everette A. Powell, Jr.

[57] ABSTRACT

An improved helicopter rotor flexbeam (20) comprises a pair of generally parallel outwardly open, cross-sectionally C-shaped beams (25) of a geometry which defines therein a first inboard region (A) of enhanced out-of-plane flexibility and a second outboard region (B) of enhanced in-plane and torsional flexibility.

16 Claims, 4 Drawing Sheets

HELICOPTER ROTOR FLEXBEAM

This invention was made with Government support under a contract awarded by the Department of the Army. The Government has certain rights in this invention.

DESCRIPTION

1. Technical Field

This invention relates generally to helicopter rotors and particularly to an improved flexbeam therefor.

2. Background Art

A helicopter rotor flexbeam is a member which connects a helicopter rotor blade to a hub attached to the end of a rotor drive shaft. In addition to connecting the rotor blade to the hub, modern flexbeams employed in bearingless rotors, accommodate operational displacements of the rotor blades by mere bending of the flexbeam whereby flexible joints such as hinges and the like are rendered unnecessary. Accordingly, it will be appreciated that such flexbeams must accommodate out-of-plane (flatwise) displacement of the blades as well as in-plane (edgewise) blade displacements attendant with blade rotation. Likewise, flexbeams must have sufficient torsional flexibility to torsionally transmit, with a minimum of moment to the blade, pitch change displacements applied to the flexbeam from the output of a pitch change actuator. However, it will also be appreciated that such in-plane, out-of-plane, and torsional flexibility must not come at the expense of structural integrity. Accordingly, a flexbeam must have sufficient strength to react severe dynamic in-plane, out-of-plane and torsional loads, as well as static out-of-plane loads placed thereon by the rotor blades. Moreover, out-of-plane and in-plane flexbeam vibration should be mutually uncoupled to avoid self-excited resonances in the flexbeam. The flexbeam should also be as short as possible for reduced weight, aerodynamic drag and radar signature and should be manufacturable in as economic a manner as possible and in a way in which stress concentrations are minimized for enhanced structural integrity and operational life.

While flexbeams for bearingless helicopter rotors are known in the art, in general, such flexbeams have been found to be disadvantageous in certain respects. For example, certain known flexbeams cannot accommodate a pitch change shaft centrally thereof and coplanar therewith, an orientation required for optimum compactness, conformal shape and the most efficient use of the mechanical output from a pitch change actuator. Certain prior art flexbeams have also been found to be lacking in their ability to mount a helicopter rotor blade in a manner in which blade prelag or precone are conveniently achieved. Various prior art flexbeams also fail to adequately restrain static deflection (droop) of the blades in as effective a manner as possible which sometimes necessitates the use of a pitch change shaft as a droop inhibitor which in turn jeopardizes the ability of the pitch change shaft to be placed in a coplanar orientation with respect to the flexbeam.

DISCLOSURE OF INVENTION

Accordingly, it is among the objects of the present invention to provide an improved helicopter rotor flexbeam having enhanced flexibility, structural integrity and which is economically manufacturable.

It is also among the objects of the present invention to provide an improved helicopter rotor flexbeam of enhanced strength and having uncoupled out-of-plane and in-plane vibrational characteristics for reduced self-excited vibrational resonances.

It is also among the objects of the present invention to provide an improved helicopter rotor flexbeam of enhanced torsional stiffness distributed over the length thereof; in which stress concentrations are minimized for enhanced structural integrity; and in which a blade pitch change shaft can be accommodated in coplanar orientation therewith, yet which is compact and light in weight.

It is also among the objects of the present invention to provide an improved helicopter rotor flexbeam to which a blade may be mounted in a manner in which desired blade prelag and precone are conveniently achieved.

It is also among the objects of the present invention to provide an improved helicopter rotor flexbeam wherein static support of a corresponding blade is enhanced for reduced blade droop and wherein neutral axis and shear center orientation are optimized.

These and other objects of the present invention are achieved in a flexbeam comprising a pair of generally parallel, spaced beams of outwardly open, C-shaped cross section, each of the cross-sectionally C-shaped beam having radially inner (inboard) and outer (outboard) regions, the inboard region rendering the flexbeam more compliant than the outboard region in an out-of-plane direction, and the outboard region rendering the flexbeam more compliant than the inboard region in in-plane and torsional directions.

Such segregation of the various modes of flexbeam compliance is achieved by a novel geometry of the cross-sectionally C-shaped beams, each beam comprising a generally upright, elongate web having a pair of generally parallel elongate flanges extending from the edges thereof in planes which are generally perpendicular to that of the web. In general, web height decreases sharply from the root end of each beam in a radially outward direction, reaching a minimal height at the radially inner (out-of-plane flexible) region. Web height gradually increases in a radially outward direction from the radially inner region for enhanced out-of-plane stiffness at the radially outer (in-plane and torsionally flexible) region for reduced static blade droop. Flange thickness is maximum at the root and tip ends of the cross-sectionally C-shaped beams to react operational loads at the locations of flexbeam attachment to the blade and hub. Web and flange thickness are minimum at the radially outer region of each cross-sectionally C-shaped beam for enhanced torsional and in-plane flexibility thereat while beam width generally decreases from a maximum value at the root end of the beam radially outwardly, to a minimum value at the radially outer region and tip of the beam for enhanced in-plane flexibility thereat. While, as set forth hereinabove, the cross-sectionally C-shaped beams are generally parallel, the web geometry of the beams provides maximal spacing therebetween at medial portions thereof for coplanar accommodation of a pitch change shaft between the beams despite bending thereof when the flexbeam accommodates the in-plane blade displacements.

The cross-sectionally C-shaped beams are joined at the root and tip ends thereof by a pair of blocks which accommodate fasteners for attachment of the flexbeam to the helicopter hub and a corresponding blade, respectively. The block joining the beams at the tip ends thereof and the associated fasteners can accommodate blade pivoting for compact storage of the blade while mounted on the helicopter, and as well as any desired degree of blade preconing. The block which joins the beams at the root ends thereof and the associated fasteners allow the flexbeam and blade to be angularly displaced from the attached portion of the hub in a horizontal plane whereby the blade may be provided with any degree of desired prelag.

With the flexbeam of the present invention bending moments and shear stresses are effectively reacted while static droop is minimized by the radially inward location of the out-of-plane flexible region. Since droop is minimized, additional droop stops are unnecessary. Angling the pitch change shaft with respect to the flexbeam is also unnecessary for droop support and therefore the shaft may be located in the same plane as the flexbeam, for compactness, reduced drag, conformal shape and minimal pitch lag. The web and flange geometry of the cross-sectionally C-shaped beams also reduces axial strains due to bending and tension since torsional loads in adjusting blade pitch are applied near the loci of beam cross-sectional shear centers. Local edgewise bending is minimized due to the parallel, spaced, relatively straight beam neutral axes which are generally parallel with the neutral axis of the attached blade. Segregating the in-plane flexible and the out-of-plane flexible regions allows spacing of the in-plane and out-of-plane natural frequencies from each other and from (significantly below) the operational frequencies of rotor rotation, thereby reducing the risk of excessive vibrational response under operating conditions. The flexbeam is conveniently manufacturable with modern composite techniques in a manner which minimizes the number of stress concentrations therein. The flexbeam may be manufactured in either a pretwisted or any untwisted state, for preselected rotor pitch.

BEST MODE FOR CARRYING OUT THE INVENTION AND INDUSTRIAL APPLICABILITY THEREOF

Figure 1:
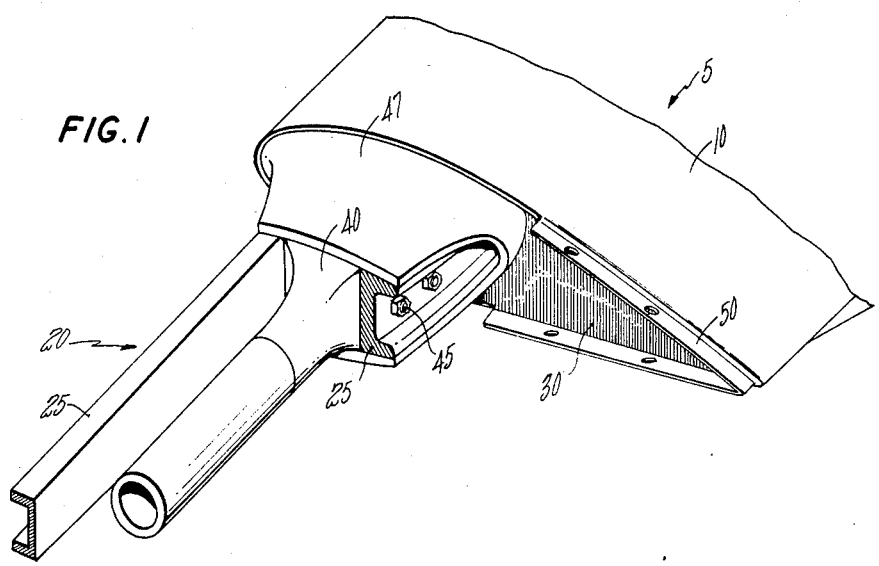
FIG. 1 is a fragmentary, isometric view of the attachment of a helicopter rotor blade to the flexbeam of the present invention.
Figure 2:
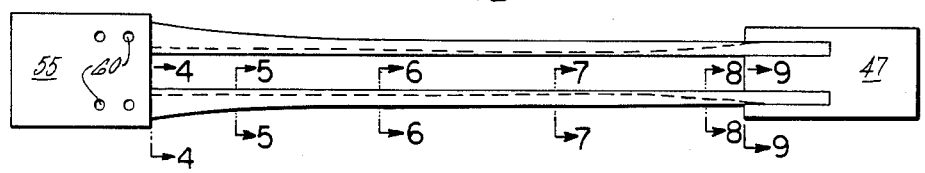
FIG. 2 is a top plan view of the flexbeam of the present invention.

Referring to FIG. 1, a helicopter rotor blade 5 having an airfoil surface 10, is attached to a flexbeam 20 comprising a pair of first and second generally parallel spaced beams 25 of outwardly open C-shaped cross section. The blade may be hollow or filled with any suitable filler material such as any various known synthetic foams 30. Cross-sectionally C-shaped beams 25 receive a pitch change shaft 35 therebetween in generally coplanar orientation therewith, the pitch change shaft terminating in a solid end portion 40 attached to the ends of the C-shaped beams by through-bolts 45. The subassembly of the pitch change shaft and flexbeam is received within a block 47 which is fixed to a blade spar (not shown) in any known manner, interiorly of surface 10. This subassembly may be covered with an aerodynamic fairing (not shown) attached to flanges 50 at the root end of aerodynamic surface 10. As will be readily appreciated by those skilled in the art, the output of a pitch-change actuator (not shown) applied to pitch change shaft 35 will cause the shaft to twist about its own longitudinal axis to adjust the pitch (angle of attack) of blade 5. As set forth hereinabove, blade 10 will also experience in-plane (edgewise) and out-of-plane (flatwise) displacements thereof in the normal operation of the helicopter in which it is employed. Since the root end of flexbeam 20 is fixed solidly to the helicopter hub (not shown) it will be appreciated that such in-plane and out-of-plane blade displacements must also be accommodated by flexbeam 20.

Referring to FIGS. 2 through 9, and as noted above, flexbeam 20 comprises a pair of substantially identical, generally parallel spaced beams of outwardly open C-shaped cross section 25, joined at the tip ends thereof by block 47 and at the root ends thereof by block 55. Block 55 is bored at locations 60 normal to the midplane of the flexbeam to accommodate fasteners such as bolts or the like by which the flexbeam is attached to the helicopter rotor hub as by a clevis-type connection (not shown) thereto. Likewise, block 47 is bored at locations 65, bores 65 extending parallel to the mid-plane of the flexbeam to accommodate through bolts 45.

Each of the cross-sectionally C-shaped beams comprises a generally upright elongate web 70 and extending from the edges thereof, a pair of generally parallel elongate flanges 75 disposed in planes perpendicular to the web. The ends of the beams 25 disposed within block 55 are rendered solid by means of fillets 77 fixed between the root ends of flanges 75.

Figure 10:
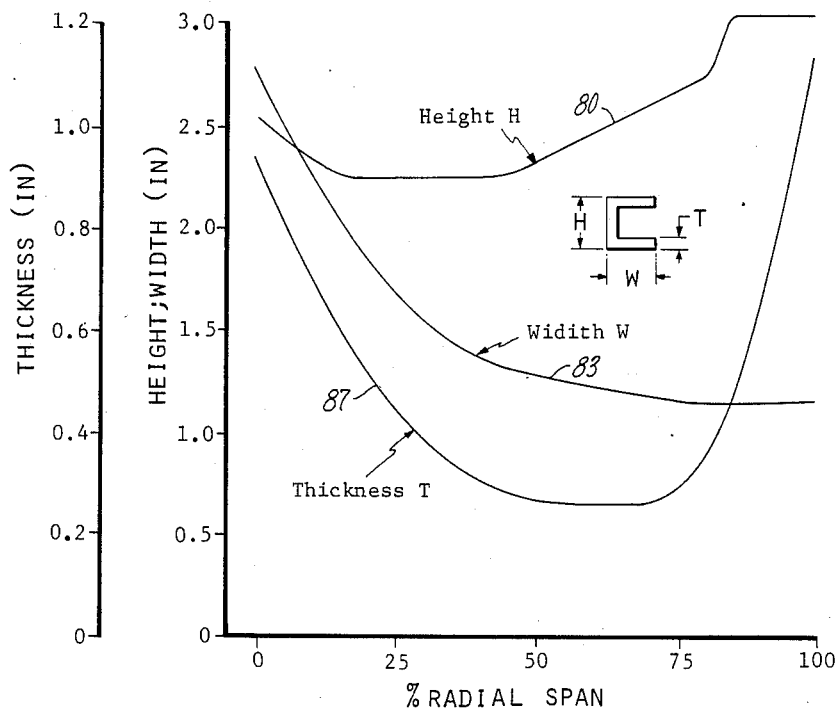
FIG. 10 is a graphical representation of the beam height, width and flange thickness of a single cross-sectionally C-shaped beam employed in the flexbeam of the present invention.

In addition to FIGS. 2 through 9, the relative height and width of the cross-sectionally C-shaped beams as well as the thickness of the flanges thereof is illustrated in FIG. 10. FIG. 10 is a graphical representation of beam height (web height), width and flange thickness of a typical beam, plotted along the radial span of the beam. With regard to web height, as illustrated in FIGS. 4 through 9 and line 80 of FIG. 10, web height decreases from the root end in a radially outward direction, reaching a minimum dimension at approximately 20% of the beam span. Height remains constant in a radially outward direction to approximately 40% of the beam span and then increases generally linearly from 40% to approximately 80% of the beam span. From this point, web height increases sharply to its maximum value and remains relatively constant, radially outwardly to the tip of the beam where the beam is fixed to block 47.

With regard to the beam flanges, as illustrated by line 83 of FIG. 10, flange width decreases sharply from the root end of the beam to a location at approximately 40% of the beam's span at which point the width decreases further, but at a lesser and more linear rate to a point at about 75% of the beam span. From that point, outwardly, flange width remains constant to the tip end where the beam is fixed to block 47.

As illustrated by line 87 in FIG. 10, flange thickness drops off sharply from the root end of the beam, radially outwardly to a point corresponding to approximately 40% of the beam's span. From this point, to a point at approximately 60% of the beam's span, flange thickness decreases, but at a much lesser and more linear rate. From 60% of the span length to the tip end, flange thickness increases sharply to a maximum value at the tip end where the beam is secured within block 47.

Figure 11:
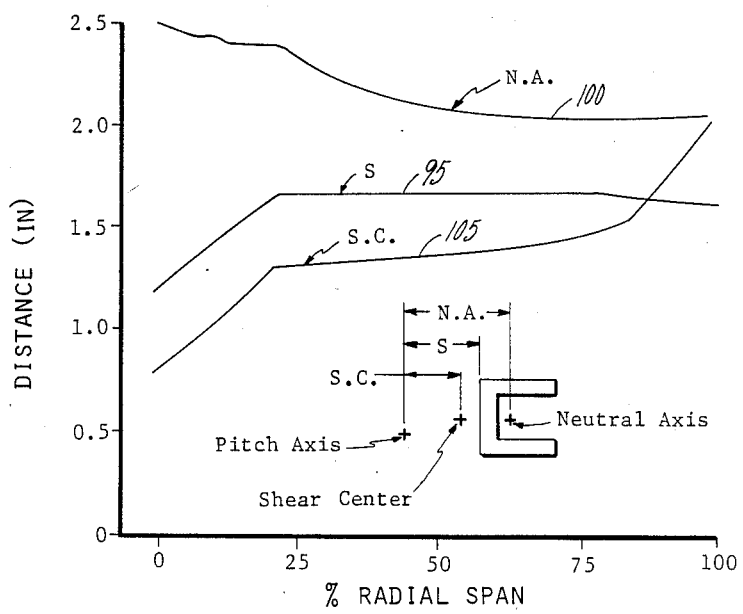
FIG. 11 is a graphical representation of the location of the loci of cross-sectional shear centers and the neutral axes associated with the cross-sectionally C-shaped beams employed in the flexbeam as well as the spacing of such beams from one another.

As set forth hereinabove, cross-sectionally C-shaped beams 25 are disposed in a generally parallel mutual orientation., Referring to FIG. 11, line 95 thereof graphical depicts the spacing of the individual beams from the helicopter's pitch axis (the longitudinal axis of pitch change shaft 35). It will be observed from line 95 that beam spacing increases from the root end, reaching a maximum value at about 25% of the beams' span. This maximum value remains relatively constant in a radially outward direction to a point at approximately 75% of the beam's span. From this point, the spacing decreases slightly to the tip ends of the beams.

The beam geometries described hereinabove define neutral axes (loci of beam centroids) graphically illustrated at line 100 of FIG. 11. It will be noted from line 100, that the neutral axis of each beam varies only slightly from a set distance from the pitch change axis whereby the neutral axes of both beams are relatively straight and mutually parallel in a radially outward direction, with each other and with the neutral axis of a corresponding blade. With regard to the shear centers, it will be seen from line 105 of FIG. 11, that shear center spacing from the pitch axis increases in a radially outward direction from the root end of the beam to a point at approximately 20% of the beam span. From this point, the spacing of the shear centers from the pitch change axis remains relatively constant, and at a relatively low value in a radially outward direction to approximately 85% of the beam span from which point the shear center spacing from the pitch change axis increases to the tip end of the beam.

Figure 12:
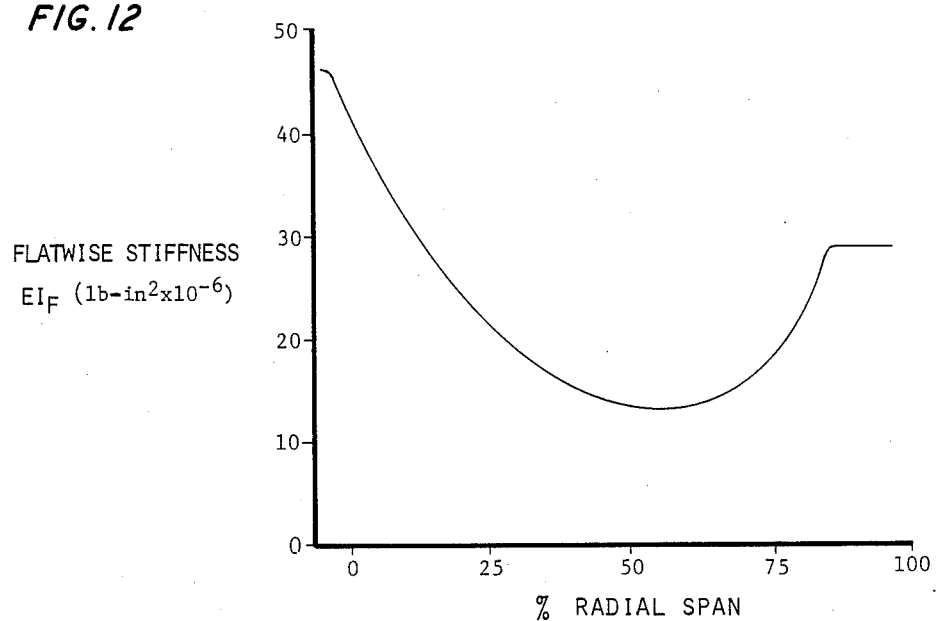
FIG. 12 is a graphical representation of the flatwise or out-of-plane stiffness of the cross-sectionally C-shaped beams.
Figure 13:
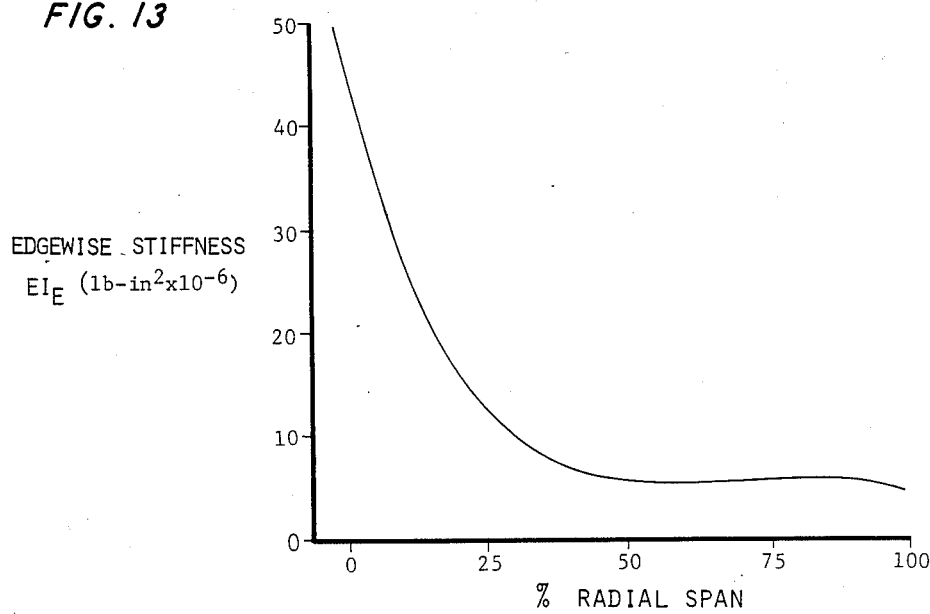
FIG. 13 is a graphical representation of the edgewise or in-plane stiffness of the cross-sectionally C-shaped beams.

FIGS. 12 and 13 graphically illustrate the out-of-plane and in-plane stiffness of each of beams 25. Referring to FIG. 12, it is seen that flatwise stiffness decreases sharply from the root end of each beam to a minimum value at approximately 50% of the beam's radial span. Flatwise stiffness is very low, however, from approximately 25% to approximately 75% of the beam's span. From this minimal value, flatwise stiffness increases to a point at approximately 80% of the beam's span and remains relatively constant out to the location of the beam's attachment to block 47. Regarding in-plane stiffness, it is seen from FIG. 13 that in-plane stiffness falls off sharply in a radially outward direction to a point at approximately 60% of the beam's span. In-plane stiffness remains generally at this minimum value along the outer 50% of the beam's span. However, it is noted that in-plane stiffness is quite low from approximately 25% of the beam's span to the outer tip of the beam.

Figure 3:
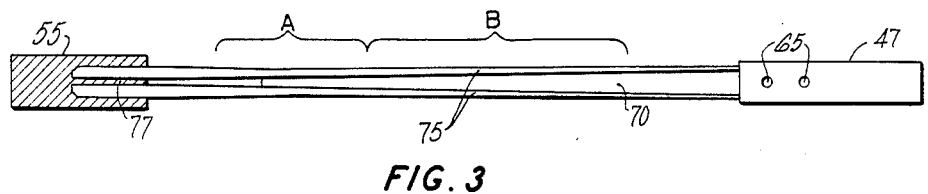
FIG. 3 is an elevation of the flexbeam of the present invention.
Figure 4:
FIG. 4 is a cross-sectional view of the flexbeam of the present invention taken in the direction of line 4—4 of FIG. 2.
Figure 5:
FIG. 5 is a cross-sectional view of the flexbeam of the present invention taken in the direction of line 5—5 of FIG. 2.
Figure 6:
FIG. 6 is a cross-sectional view of the flexbeam of the present invention taken in the direction of line 6—6 of FIG. 2.
Figure 7:
FIG. 7 is a cross-sectional view of the flexbeam of the present invention taken in the direction of line 7—7 of FIG. 2.
Figure 8:
FIG. 8 is a cross-sectional view of the flexbeam of the present invention taken in the direction of line 8—8 of FIG. 2.
Figure 9:
FIG. 9 is a cross-sectional view of the flexbeam of the present invention taken in the direction of line 9—9 of FIG. 2.

The geometry of the beams and, therefore, the static in-plane and out-of-plane stiffnesses thereof described hereinabove define in the beams, under dynamic (blade rotational) conditions, an inboard region A and an outboard region B (see FIG. 3). Inboard region A is more compliant in an out-of-plane direction than is outboard region B. On the other hand, outboard region B is more compliant in in-plane and torsional directions than is inboard region A.

Accordingly, out-of-plane blade displacements are accommodated by flexbeam bending in region A while in-plane blade displacements as well as torsional blade displacements (due to pitch adjustment thereof) are accommodated by flexbeam bending and twisting at region B. Since out-of-plane and in-plane regions of enhanced flexibility are segregated from one another, the flexbeam may be "tuned" such that the resonant out-of-plane and in-plane natural frequencies are adequately spaced from one another and both less than 1 per rotor revolution. This significantly reduces the forced response vibration from that inherent in rotors in which the in-plane and out-of-plane natural frequencies occur on opposite sides of the spectrum of rotor rotational frequencies.

By locating the region of enhanced flatwise flexibility at an inboard location on the flexbeam, static droop is minimized since the outboard region of the flexbeam remains relatively straight under static blade loads and, therefore, minimizes additional downward flexbeam curvature, thereby resulting in less blade tip deflection. Since static droop is minimized by the intrinsic resistance of the flexbeam to curvature thereof, the pitch change shaft is not required to provide droop support as it is in certain prior art arrangements and, therefore, can be conveniently located within the plane of the flexbeam. This minimizes pitch lag coupling while enabling the conformal packaging of the flexbeam, resulting in low aerodynamic drag and reduced radar cross section. Accordingly, adjustments in blade pitch are effected with minimal torsional force input to the pitch change shaft. By locating region A slightly outwardly from the root end of the flexbeam, this end exhibits improved solidity (due to the fillets disposed between the flange ends) for enhancing the flexbeam's ability to react bending moments and shear stresses thereat and to accommodate removable blade attachments for blade folding or removal.

Location of region B outwardly from region A allows maximum spacing of the neutral axes at the radially inner portion of the flexbeam, rendering that portion stiff in an in-plane direction to react bending moments and shear stresses thereat. The proximity of the loci of cross-sectional shear centers to the pitch change axis minimizes the torque input requirements necessary to achieve given blade pitch settings as does the minimal beam flange thicknesses in this region. Since the edgewise flexible portion of the flexbeam is located in region B, accommodation of bending resulting from the slight noncoincidence of the beam shear centers from the pitch axis is enhanced during torsional deformation which is accompanied by selectively low axial strains.

With regard to the spacing of the individual cross-sectionally C-shaped beams, the maximal web spacing along medial portions of the beams allows an in-plane accommodation of the pitch change shaft despite substantial in-plane flexbeam bending. Furthermore, the spacing of the cross-sectionally C-shaped beams spaces the neutral axes thereof whereby local edgewise bending is minimized, particularly at the radially inner region of the flexbeam where the neutral axis spacing is maximum.

It will be appreciated that the flexbeam of the present invention is attached to the corresponding blade rotor hub. Bores 60 and block 55 are easily engageable with a clevis connection on the helicopter's rotor hub and may be positioned to conveniently accommodate any desired degree of blade lead or lag. The solidity of the cross-sectionally C-shaped beams interiorly of block 55 positions the neutral axis of each beam in line with its attachment to the block for optimal reaction of moment loads. Similarly, bores 65 in block 47, extending in a direction coplanar to the flexbeam itself, minimize drag and radar observability associated with the connection to the blade. The solidity of the tip ends of the cross-sectionally C-shaped beams position the neutral axes at the tip ends thereof in line with the attachment to block 47 for enhanced reaction of moment loads. Bores 65 may be positioned to provide any desired degree of angular orientation of the blade with respect to the flexbeam (preconing).

The flexbeam of the present invention is conveniently and economically manufacturable by known techniques. It is contemplated that the cross-sectionally C-shaped beams as well as blocks 47 and 55 and fillets 77 will be formed from any of various known composite materials to achieve desired flexbility, strength and lightness. Accordingly, it will be appreciated that any of various fibers employed in composites such as fibers of boron, aluminum, graphite or any of various known synthetic glasses may be employed as may be any of various known binders such as epoxy resin or any of various other metallic or nonmetallic binders.

Figure 14:
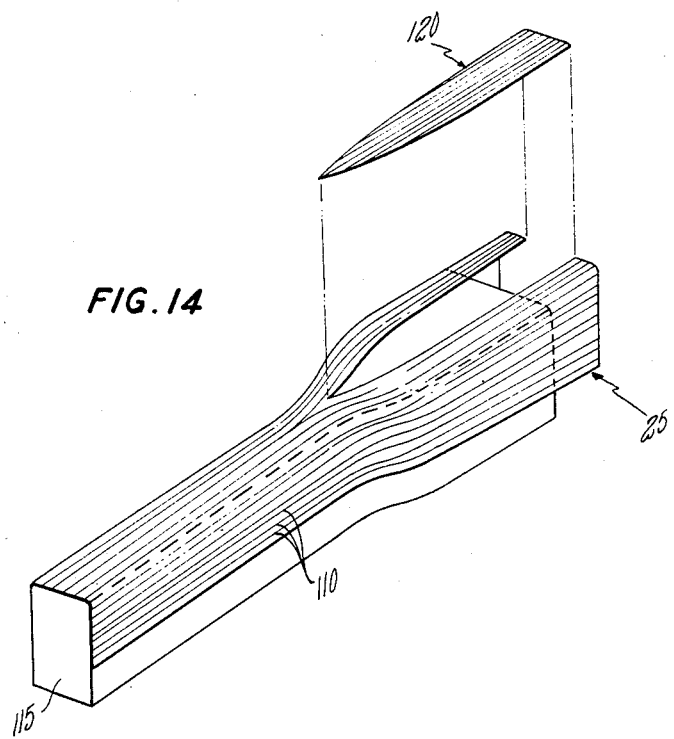
FIG. 14 is an isometric representation of a manner of constructing the cross-sectionally C-shaped beams.

Referring to FIG. 14, the cross-sectionally C-shaped beams may be formed by laying-up fibers 110 disposed in uncured or partially cured binder on a male mandrel 115. To achieve a desired tapering of the web and/or flanges, added width may be achieved in those portions of the beam by laying-up continuous lengths of fibers in such a way as to define voids which are filled by darts 120 of the composite material. Preferably, the darts are employed as near as possible to the neutral bending axis of the resultant beam where stress is minimized. The continuity of the fibers in beam locations other than those filled by darts 120, reduces stress concentrations due to what would otherwise require fiber terminations at the free edges of the beams where stresses are normally highest. The use of darts in this manner also enhances the ease with which the tapered portions of the cross-sectionally C-shaped beams are formed.

While a particular embodiment of the flexbeam of the present invention has been illustrated and described, it will be appreciated that various modifications thereof may be made without departing from this invention. Thus, in keeping herewith, various changes in the exact geometry of the flexbeam may be made, as may changes in the relative stiffnesses of the various portions of the flexbeam. Similarly, while the flexbeam has been described as a component separate from the blade spar and fixed thereto, it will be understood that in accordance herewith, the spar and flexbeam may be integrally formed. Accordingly, it is intended by the following claims to cover these and any other modifications and/or improvements to the flexbeam hereof as may fall within the true spirit and scope of this invention.

Having thus described the invention, what is claimed is:

1. A flexbeam of enhanced out-of-plane, in-plane and torsional flexibility, for mounting a helicopter rotor blade to a hub therefor, said flexbeam being characterized by:

first and second generally parallel, spaced beams adapted for accommodating therebetween, a pitch change shaft disposed generally parallel thereto and generally coplanar therewith;

each of said beams including an inboard root end, an outboard tip end and adjacent inboard and outboard regions disposed therebetween:

said inboard region being of a first geometry and having a first characteristic stiffness which, under dynamic operating conditions, renders said inboard region more compliant than said outboard region in an out-of-plane mode of vibration; and said outboard region being of a second geometry and having a second characteristic stiffness which, under dynamic operating conditions, renders said outboard region more compliant than said inboard region in in-plane and torsional modes of vibration, whereby the natural frequencies of vibration of said flexbeam in said in-plane and out-of-plane modes may be spaced from one another, below the range of frequencies of rotor rotation.

2. The flexbeam of claim 1 characterized by said spaced beams being of generally outwardly open, C-shaped cross section.

3. The flexbeam of claim 1 characterized by said cross-sectionally C-shaped beams being maximally spaced along the medial portions thereof for accommodation of a pitch change shaft therebetween despite bending of said flexbeam.

4. The flexbeam of claim 1, characterized by each of said cross-sectionally C-shaped beams comprising a generally upright, elongate web and extending from the edges thereof, a pair of generally parallel elongate flanges disposed in planes generally perpendicular to said web.

5. The flexbeam of claim 4 characterized by said web being of minimal height at said radially inner region of said flexbeam for enhancement of said out-of-plane flexibility thereat.

6. The flexbeam of claim 5 characterized by said web generally increasing in height in a radially outward direction, serially along said radially inner and outer regions of said flexbeam.

7. The flexbeam of claim 4 characterized by said flanges being of minimal width in said radially outer region of said flexbeam for enhancement of said edgewise flexibility thereat.

8. The flexbeam of claim 7 characterized by said flanges generally decreasing in width in a radially outward direction, serially along said radially inner and outer portions of said flexbeam.

9. The flexbeam of claim 4 characterized by said flanges being of reduced thickness in said radially outer region of said flexbeam for enhancement of said torsional flexibility thereat.

10. The flexbeam of claim 9 characterized by said flanges decreasing in thickness in a radially outward direction along said radially inner and outer region of said flexbeam, reaching a minimal thickness at a medial portion of said radially outer region of said flexbeam, and increasing in thickness in a radially outward direction from said medial portion of said radially outer flexbeam region.

11. The flexbeam of claim 1 characterized by said cross-sectionally C-shaped beams being joined at the root and tip ends thereof by a pair of blocks which provide locations of connection with said hub and blade, respectively.

12. The flexbeam of claim 11 characterized by one of said pair of blocks joining said cross-sectionally C-shaped beams at the tip ends thereof, said one block being adapted to accommodate fasteners for attaching a rotor blade to said flexbeam in a manner allowing said rotor blade to pivot vertically for the preconing and compact storage thereof.

13. The flexbeam of claim 11 characterized by one of said pair of blocks joining said cross-sectionally C-shaped beams at the root ends thereof, said one block being adapted to accommodate fasteners for attaching said flexbeam to said hub in a manner allowing said flexbeam and said rotor blade to pivot horizontally for adjusting the lead and lag of said rotor blade with respect to said hub.

14. The flexbeam of claim 1 characterized by said flexbeam being formed from composite materials.

15. The flexbeam of claim 14 characterized by said composite materials comprising a plurality of fibers disposed within a matrix of binder, said fibers being continuous along the free edges of said spaced beams.

16. The flexbeam of claim 14 characterized by said spaced beams being tapered, said tapered beams being formed by the disposition of tapered composite darts within plies of continuous filament, composite material.

* * * * *